July 24, 1962 P. C. CONSTANT, JR 3,046,534
REMOTE METER READING APPARATUS
Filed Oct. 5, 1959 3 Sheets-Sheet 1
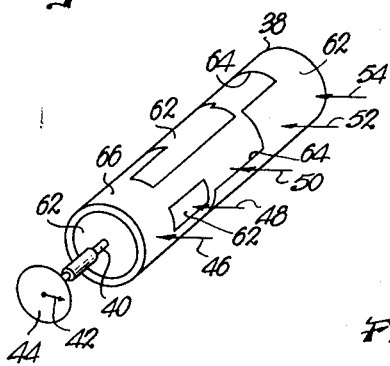
Fig.3.
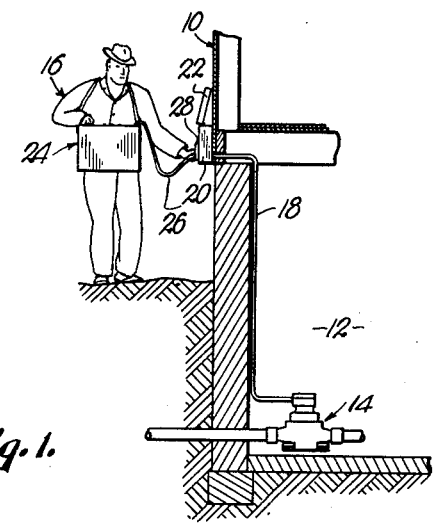
Fig.1.
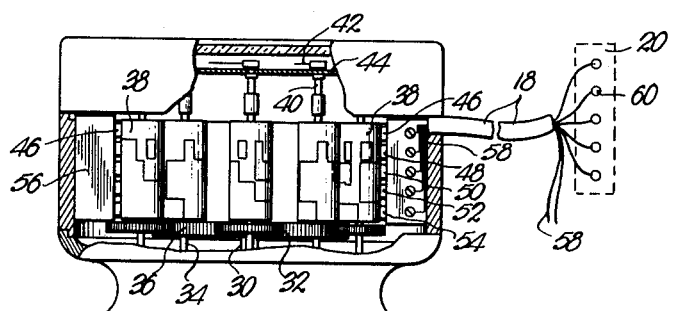
Fig.2.
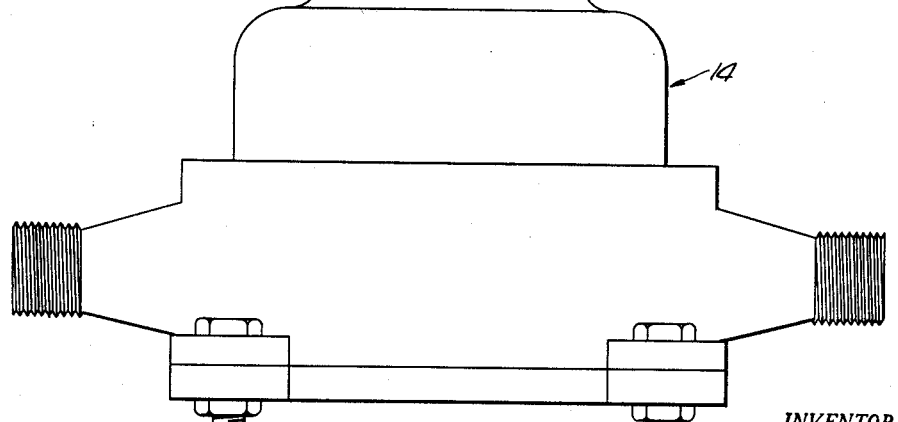
INVENTOR.
Paul C. Constant, Jr.
BY
Hovey, Schmidt, Johnson & Hovey
ATTORNEYS.

July 24, 1962 P. C. CONSTANT, JR 3,046,534
REMOTE METER READING APPARATUS
Filed Oct. 5, 1959 3 Sheets-Sheet 2

INVENTOR.
Paul C. Constant Jr.
BY
Hovey, Schmidt, Johnson & Hovey
ATTORNEYS.

July 24, 1962 P. C. CONSTANT, JR 3,046,534
REMOTE METER READING APPARATUS
Filed Oct. 5, 1959 3 Sheets-Sheet 3

INVENTOR.
Paul C. Constant Jr.
BY
Hovey, Schmidt, Johnson & Hovey
ATTORNEYS.

United States Patent Office 3,046,534
Patented July 24, 1962

3,046,534
REMOTE METER READING APPARATUS
Paul C. Constant, Jr., 3014 E. Meyer, Kansas City, Mo.
Filed Oct. 5, 1959, Ser. No. 844,303
4 Claims. (Cl. 340—188)

This invention relates to improved apparatus for remotely reading household public utility meters or the like.

The problems and disadvantages connected with the conventional practice requiring the periodic entry of a human "meter reader" into the premises to read household utility meters are so well known and have been so fully discussed in the patent disclosures of the many others who have previously tried but failed to provide a satisfactory practical solution to the problem as to necessitate no repetition thereof herein. Similarly, the number, nature and disabling disadvantages of the numerous prior attempts to solve such problem are generally recognized, it being noted that such prior attempts have failed primarily either because of the impracticability for continued operation without excessive maintenance of the fluid or flexible mechanical couplings proposed, or because of the complexity, lack of reliability or power consumption characteristics of the electrical arrangements proposed.

Accordingly, it is the primary purpose of this invention to provide improved, simplified, practical and accurate, remote meter reading apparatus overcoming all of the disadvantages inherent in the various other systems previously proposed for use in accomplishing the remote reading of household public utility meters.

Important objects of the invention include the provision of such improved apparatus which continuously stores at the meter itself, the information to be intermittently read-out at a location remote from the meter, which requires no continuous or other connection of the meter or its associated parts with a commercial or other source of power within the premises, which utilizes a binary system of coding the information to be read-out in order to minimize the number of electrical parts, conductors and connections required, which permits verification at the meter itself at any time of the information being made available for read-out remotely from the meter, which utilizes information outputs consisting of reliable continuous flows of electrical current rather than pulsed currents, which is especially adapted for reading-out angular position data relative to shafts which at the time may be either stationary or rotating only very slowly, which is adapted for use with various types of utility meters including those used for measuring water consumption, gas consumption and the like, which requires for operation only a portable source of electrical power, such as batteries which need be connected with the portions of the apparatus inside the premises only during an actual remote read-out operation and is thereby rendered immune from power variations such as when commercial mains are utilized, which may be adapted for remotely reading-out information carried from the parts within the premises in binary form either as decimalized or binary type final data, which is adapted for actuating read-out devices of either the indicating type such as lamps or of the recording type such as printing solenoids, which does not in any way disturb the regular operation of the meter which continues to function in normal fashion both during and between read-out operations, which is resistant to tampering without rendering the occurrence of same evident when a read-out operation is made, and which is simple in construction and operation minimizing both costs and maintenance requirements as well as rendering the portion of the apparatus to be transported from location-to-location in the reading of different meters, light in weight and easily portable.

Other important objects of the invention include certain significant details of arrangement and construction, it being noted that the invention employs a coded commutator-like switching means for each of the rotatable metering shafts of the meter whose position is to be read-out, such switching means being coupled by electrical conductors only with a multiterminal electric socket on the exterior of the premises adapted to releasably receive a multiterminal electric plug in turn coupled only by electrical conductor means with a portable unit carried by the meter reader and containing both the batteries or other electrical power source for the apparatus and a plurality of read-out devices for either indicating the information from the meter for manual recording by the meter reader or for directly recording such information by printing the same upon a ticket or in other conventional manner.

It is to be understood that two embodiments of the invention are disclosed herein for purposes of illustrating the invention and that, although one of such embodiments constitutes the currently preferred form of the invention, the disclosure of such illustrative embodiments is not to be understood as restrictive, since those skilled in the art could, when familiar with the disclosure herein, make a number of minor modifications or variations of the apparatus without departing from the spirit and principles of the invention.

In the accompanying drawings:

FIG. 1 is a fragmentary view partially in cross-section and partially in elevation, of a building and meter equipped with the apparatus of the invention and shown during the occurrence of a read-out operation handled by the meter reader entirely from the outside of the premises;

FIG. 2 is an elevational view, with parts broken away and shown in cross-section, for clarity of illustration, of a typical water meter or the like as same might be modified by the addition thereto, of the switching means associated therewith in accordance with this invention;

FIG. 3 is a perspective view of one of the switching drums associated with each of the metering shafts to be read-out, showing the contacts associated with such drum schematically and also illustrating the relocation of the regular indicating scale and pointer of the meter;

Figure 4:
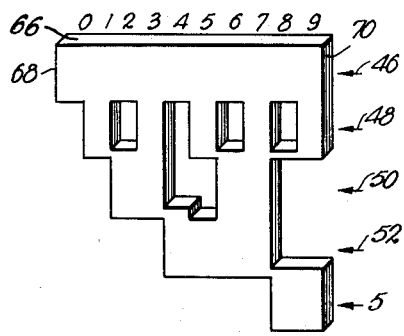
FIG. 4 is a perspective, flattened-out view of the conductive contact piece embedded in each of the switching drums of a simplified, binary read-out embodiment of the invention.

Referring first to FIG. 1, a house or other building 10 having a basement 12, is provided with a public utility meter 14 inside the latter. In order for a meter reader, indicated at 16, to be able to read-out the consumption from the meter 14, the latter is modified by the addition, either integrally or as an accessory, of coded commutator-like switching means hereinafter to be described, which are coupled by a multiconductor electrical cable 18 with a multiterminal electric socket 20 having a normally closed rain cover 22. The meter reader 16 carries a portable read-out unit generally designated 24 and hereinafter to be more fully described, which is coupled through a multiconductor electrical cable 26 with an electrical plug 28 adapted to be releasably mated with the socket 20 for accomplishing electrical connection between the conductors of the cable 26 and the conductors of the cable 18.

Referring next to FIG. 2, the meter 14 is conventionally provided with a consumption driven, rotatable shaft 30 having a pinion 32 thereon with a plurality of metering shafts 34 through cooperating pinions 36 on the latter. It may be noted that the parts 30, 32, 34 and 36 of the meter 14 are all conventional, and that each of the shafts 34 normally carries an indicating pointer associated with a calibrated scale on the meter 14.

In the preferred construction of the present invention there is rigidly mounted upon each of the shafts 34 by any suitable means, a commutator-like switching drum 38 adapted for rotation with its shaft 34. An extension shaft 40 is oppositely coupled to each of the drums 38 and provided with a pointer 42 thereon cooperable with a calibrated scale plate 44 for providing a visual indication of the reading of the meter 14 by inspection at any time of the meter within the basement 12. Operably associated with each of the switching drums 38 is a plurality of spring biased, electrically conductive wipers 46, 48, 50, 52 and 54, each adapted to wipe a different annular zone on the surface of the drum 38 as the latter is rotated by the shaft 34 upon which it is mounted. It will be noted that in the illustrated embodiment there are five of the wipers 46 et seq. provided for each of the switching drum means 38, such number being optimum for binary system read-out, which is preferred for at least this part of the apparatus in order to minimize the parts required. Each set of wipers 46 is mounted on electrically insulating means within the meter as indicated at 56 so that the wipers 46 et seq. will be electrically isolated from each other. Each wiper 46 et seq. of each set thereof is connected by electrical conductor means as at 58 forming a part of the multiconductor cable 18 which leads to the socket schematically indicated in FIG. 2 as at 20, each of the wipers 46 et seq. being electrically coupled with a corresponding terminal 60 of the socket 20.

Referring next to FIG. 3, one of the switching drums 38, which it is to be understood may all be identical, is illustrated in greater detail and will be seen to include a cylindrical piece 62 of electrical insulating material having depressions 64 therein for receiving in flushly embedded relationship an annularly bent electrically conductive metal plate 66 of irregular boundaries, as hereinafter to be described, for the purpose of providing a binary coded read-out. The wipers 46, 48, 50, 52 and 54 are illustrated schematically in their proper relationship to the annular zones of the drum 38 which they are adapted to contact. It will be noted that wipers 46 and 50 are shown as in contact with the conductive surface of plate 66, while the remaining wipers 48, 50 and 54 are in engagement with portions of the insulative cylinder 62 so as to be making no electrical contact with the plate 66. It may be noted that the conductive surface of plate 66 at the annular zone thereof contacted by the wiper 46, extends completely around the cylindrical surface of the drum 38, so that the wiper 46 serves as a common wiper giving a continuous contact therefrom with the conductive plate 66 all of whose portions are electrically interconnected by the integral formation of the plate 66 in the preferred embodiment. Obviously, instead of a single integral conductive plate 66, the significant conductive sections of same could be separately formed and embedded in the insulating cylinder 62 and then electrically interconnected in any suitable fashion, or the main body of the cylinder 38 could be formed of one piece of metal with depressions therein filled with insulating material as appropriate if such equivalent constructions were desired for particular applications, although the construction described is currently preferred. In the switching means presented by the cooperative association of the drum 38 and the wipers 46 et seq., it will be apparent that the rotatable drum 38 serves as the movable parts of the switch means while the wipers 46 et seq. are stationary.

Referring next to FIG. 4, it will be seen that the conductive plate 66 has five annular lengths normally extending annularly around the circumference of the cylinder 38 and each having one of the wipers 46 et seq. disposed to wipe thereover. It will be further noted from FIG. 4 that each of said lengths of the plate 66 is divisible into ten sections of equal lengths corresponding to the digits 0 through 9 inclusive. These digits have been written in general alignment above the corresponding sections of the plate 66 in FIG. 4. It will be understood that the outermost edge 68 of the 0 section of the length aligned with wiper 46 normally abuts against the outermost edge 70 of the 9 section of such length when the plate 66 is in its normal annular disposition upon the drum 38. Accordingly, it will be clear that the wiper 46 is continuously in engagement with the plate 66 as the drum 38 is rotated. However, when the drum 38 is in position disposing the 0 sections in juxtaposition to the wipers 46 et seq., none of the wipers 48, 50, 52 and 54 are contacting the plate 66. As the drum advances to place the 1 sections opposite the wipers 46 et seq., wiper 48, as well as common wiper 46, are contacting the plate 66, it being noted that the wiper 48 corresponds to the digit 1 of a binary read-out system, while wiper 52 corresponds to the digit 2, wiper 52 to the digit 4 and wiper 54 to the digit 8. As the drum 38 is rotated to bring the two sections into alignment with the wipers 46 et seq., the 2 digit wiper 50 and the common wiper 46 contact the plate 66. In similar fashion, as the drum 38 rotates, various combinations of the wipers 48, 50, 52 and 54 contact the plate 66, with those wipers contacting the plate 66 always being such, due to the configuration of the plate 66, that the sum of their binary digit significances add up to the digit corresponding to the sections of plate 66 which are aligned with the wipers 46 et seq. and which is to be represented in the data being read-out.

Figure 5:
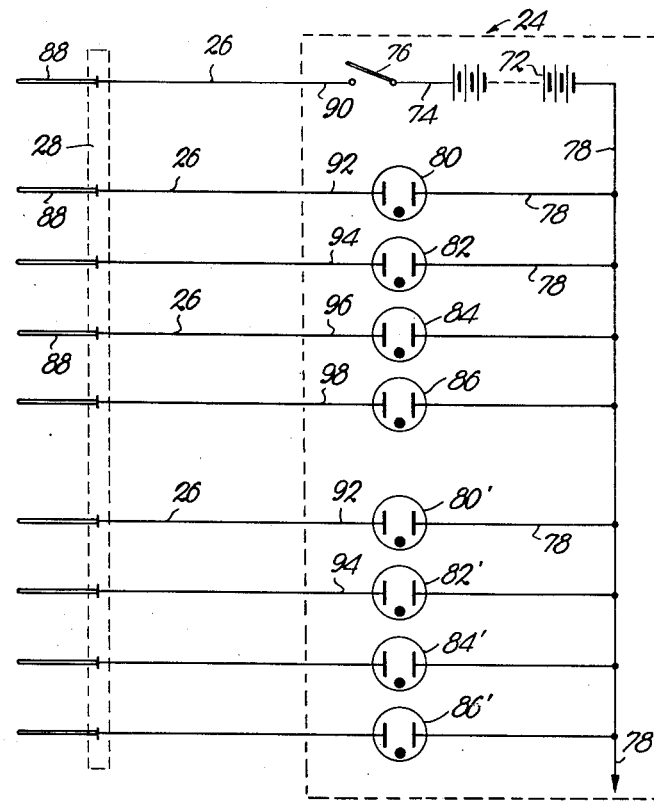
FIG. 5 is a fragmentary, schematical diagram of the components and connections comprising the portable read-out unit in such simplified embodiment of the invention.

Referring next to FIG. 5, the portable unit 24 will be seen to include a battery 72 having one terminal thereof coupled by a conductor 74 with one side of an on-off switch 76, while the other terminal of battery 72 is coupled by conductors 78 with one side of each of a plurality of neon lamps 80, 82, 84, 86, 80', 82' etc., it being understood that there will be provided one set of four indicating lamp devices 80, 82, 84, 86 for each of the metering shafts 34 whose rotational position is to be read-out through a corresponding switching means including a drum 38 and a set of wipers 46 et seq. Only two sets of such indicating lamps 80 et seq. are shown for illustrative purposes in FIG. 5.

Plug 28 is provided with a number of terminal members 88 adapted for conductive engagement with the terminal element 60 of socket 20 when the plug 28 is releasably coupled with the socket 20. Each of the pins 88 is provided with a conductor forming a part of the multi-conductor cable 26 and designated in the drawing simply by that numeral. The conductor 26 coupled with the pin 88 that is utlimately connected with a conductor of the cable 18 leading to all of the common wipers 46 when the plug 28 is coupled with socket 20, is connected by conductive structure 90 inside the unit 24 with the other side of the on-off switch 76. The conductor of cable 26 coupled with each of the pins 88 intended for coupling with a conductor of the cable 18 leading to one of the 1 digit wipers 48 is coupled inside the unit 24 by conductor structure 92 with the other side of a corresponding lamp 80, it being noted that such lamps 80 have a significance corresponding to the 1 digit of the binary read-out system in respect of the particular shaft 34 to which same corresponds. Similarly, the lamps 82, 84 and 86 of each set thereof corresponding to a given shaft 34 respectively, have significance in the binary read-out system as representing the digits 2, 4 and 8, and each of same is coupled by conductive structure 94, 96 and 98 respectively, with a corresponding conductor 26 and pin 88 ultimately leading through a corresponding terminal element 60 of socket 20 and a certain conductor in cable 18 to the wiper 50, 52 or 54 respectively of the switching means associated with the corresponding shaft 34.

In the operation of the simplified embodiment of FIG. 5, the meter reader 16 approaches the socket 20, opens the weatherproof cover 22 thereof and inserts the plug 28 coupled by the conductor cable 26 with his portable read-out unit 24. He then closes the switch 76, which completes an energizing circuit from the battery 72 for each of the indicating lamps 80 et seq. whose corresponding wiper 48 et seq. is in engagement with the plate 66 of the corresponding drum 38, the other of lamps 80 et seq. whose respective wipers 48 et seq. are not in engagement with the corresponding plate 66 remaining deenergized. Accordingly, assuming that the upper four lamps 80 et seq. in FIG. 4 corresponds to the drums 38 on a shaft 34 of the meter 14 indicating 10's of units consumed and that the angle position of rotation of such shaft 34 represents a consumption of one of such units, only the lamp 80 of such uppermost set would be energized. For further example, assume that the angular position of rotation of the 10's shaft 34 in question represented a consumption of 60 units, then the lamps 82 and 84 of such uppermost set would be energized and the lamps 80 and 86 of such set deenergized. In similar fashion, the next set of four lamps 80' et seq. may be associated with the shaft 34 whose angular position of rotation represents 100's of units consumed, so that the particular ones of lamps 80' et seq. which are energized upon closing of the switch 76, will indicate in coded form by the aggregate of digit significances of all of same that are energized, the number of 100's of units that the meter 14 registers as having been consumed. With this simple form of the invention, the meter reader 16 adds up the coded indications from each set of lamps 80 and then records manually the remotely indicated reading of the meter 14.

It may be noted that, although constituting a considerable improvement over conventional practice, such simplified form of the invention still requires manual reading and recording of the remotely indicated data. Also a 0 is indicated only by the absence of energization of any of the set of lamps 80 et seq. corresponding to the shaft 34 in question. Accordingly, the currently preferred construction goes somewhat further in order to provide both positive coding and a 0 reading and decimalized output, as well as means for automatically recording the data read-out in order to eliminate any possibility of human error on the part of the meter reader 16.

Figure 6:
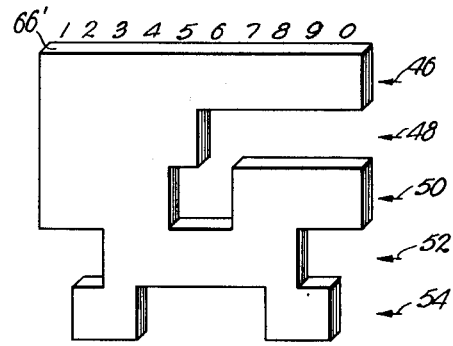
FIG. 6 is a perspective, flattened-out view of the conductive contact piece embedded in each of the switching drums showing a currently preferred embodiment of the invention.

Referring to FIG. 6 wherein is illustrated an improved conductive plate 66' for each of the drums 38, it will be seen that positive but different binary type coding has been provided for not only the digital positions representing 1 through 9 but also the position representing 0. Again, the wiper 46 represents the common wiper and the extent of the length of plate 66' with which such wiper 46 cooperates is such that the wiper 46 is always in contact with the plate 66'. The plate 66' is coded somewhat differently than described for the plate 66 and, although the wipers 48, 50, 52 and 54 still have respective significance as representing the 1, 2, 4 and 8 digits respectively of a binary read-out, the decimal significance of a given positioning of the plate 66' relative to the wipers 48 et seq. cannot be directly derived by addition of the digital significances of the wipers 48 et seq. contacting the plate 66'. When the plate 66' is in a rotated position relative to the wipers 46 et seq. intended to give a code indication of the digit 1, both the wiper 48 and the wiper 50 will be in contact with the plate 66' as well as the common wiper 46. As the plate 66' advances to place its two significant sections in juxtaposition to the wipers 48 et seq., wipers 48, 50 and 54, as well as the common wiper 46, are all in contact with the plate 66'. The other code combinations used for the various digit indications will be apparent to those skilled in the art from FIG. 6 and need not be presently listed, although it is again noted that the particular combination of wipers 48 et seq. in contact with the plate 66' for any significant positioning of the latter, including that representing 0, is different from such combination for any other position thereof.

Figure 7:
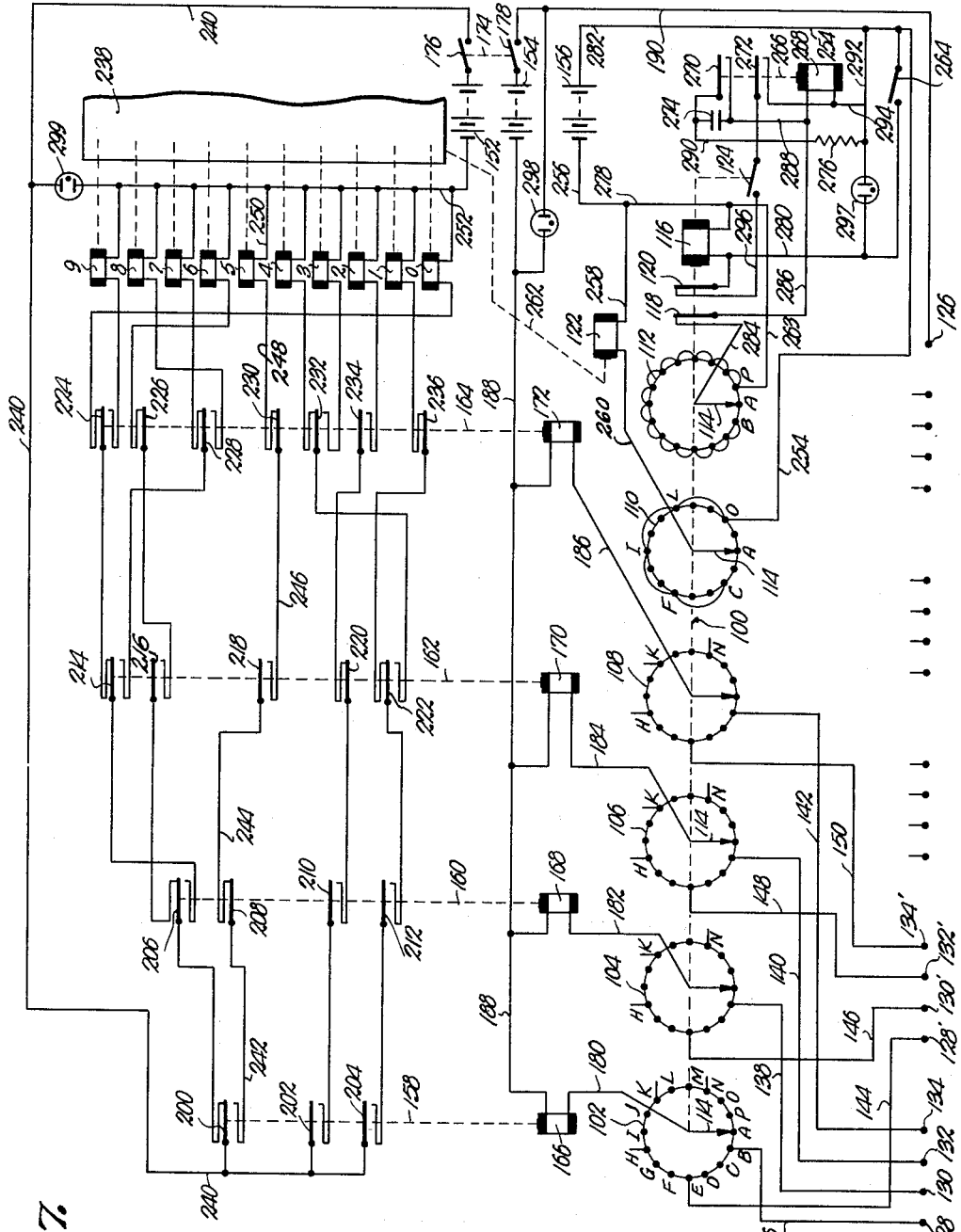
FIG. 7 is a schematic diagram of such preferred embodiment of the invention with certain of the connections omitted for clarity of illustration.

Referring now to FIG. 7, wherein is illustrated a currently preferred embodiment of the portable unit 24, there is provided a stepping switch generally designated 100 having a plurality of multicontact banks 102, 104, 106, 108, 110 and 112, each having a rotatable pole piece 114 adapted to successively engage a plurality of contacts designated in the drawing by the letters A through P inclusive, and hereinafter by the numerical designation of the bank followed by a – and the letter of the particular contact of such bank to be indicated, for example, 102–I will indicate that the topmost contact I of the leftmost bank 102 shown in FIG. 7 is referred to. Stepping switch 100 also includes a stepping solenoid 116 for operating the same and a pair of normally closed single pole, single throw interrupter switches 118 and 120 adapted to be operated by the stepping solenoid 116, as hereinafter more fully explained. The banks 102, 104, 106 and 108 are provided respectively for the handling of electrical output information having significance in a binary system corresponding to the digits 1, 2, 4 and 8 respectively. The bank 110 is utilized for controlling the operation of a record sheet shifting solenoid 122, as hereinafter more fully explained, while the bank 112 is employed in controlling the automatic advancement of the pole pieces 114 of the stepping switch 100, as also hereinafter explained. The stepping switch assembly 100 further includes a normally open single pole, single throw switch 124 operably associated with the pole pieces 114 in such manner that the switch 124 closes as soon as the pole pieces 114 make their first stepping advancement off of the contacts 102–A, 104–A etc. and onto the next contacts 102–B, 104–B etc., the switch 124 then remaining closed as the pole pieces 114 successively advance through a complete rotation thereof and back to the contacts A, whereupon the switch 124 reopens.

The terminal 126 represents a point at which the conductor within conductor cable 26 ultimately leading to all of the common wipers 46 is connected. The set of terminals 128, 130, 132 and 134 represent points at which those conductors of conductor cable 26 ultimately leading to the wipers 48, 50, 52 and 54 respectively associated with one of the drums 38, are connected. A similar set of terminals 128', 130', 132', and 134' is provided for each of the drums 38, it being understood that same represent points at which those conductors of conductor cable 26 ultimately leading to the wipers 48, 50, 52 and 54 respectively associated with the other drums 38, are connected.

The terminals 128 and 128' for each of the drums 38 are connected as follows, although only those leads associated with two of the drums 38 are fully illustrated, those leading from the terminals 128' et seq. for three other drums 38 assumed to exist in the meter 14 to be serviced being indicated only adjacent their terminations and described hereinafter. The terminations 128, 130, 132 and 134 are respectively connected by conductive means 136, 138, 140 and 142 respectively, with contacts 102–B, 104–B, 106–B and 108–B respectively. The terminals 128', 130', 132' and 134' respectively corresponding with the next drum 38, are coupled by conductive means 144, 146, 148 and 150 respectively, with contacts 102–E, 104–E, 106–E and 108–E respectively. The next set of terminal points 128' et seq. for the next drum 38 to be metered, although not illustrated in their entireties, respectively lead to contacts 102–H, 104–H, 106–H and 108–H respectively, with succeeding sets of such terminals connected to the K and the N contacts respectively, of the banks 102, 104, 106 and 108.

The unit 24 is provided with a source of electrical power which in the illustrated embodiment is shown for convenience as comprising batteries 152, 154 and 156, the separate batteries being convenient in order to allow for different operating voltages for the various solenoids and relay coils utilized in the circuitry although it will be clear to those skilled in the art that a single battery could be used with only obvious and minor alterations from the battery connections shown.

There is associated with each of the banks 102, 104, 106 and 108, a relay respectively designated 158, 160, 162 and 164. Each of the relays 158 et seq. is provided with an operating coil respectively designated 166, 168, 170 and 172. An on-off switch 174 having a pair of ganged single pole, single throw switches 176 and 178 are provided.

One side of each of the relay coils 166, 168, 170 and 172 respectively, is coupled by a conductor 180, 182, 184 and 186 respectively, with the pole piece 114 of the corresponding stepping switch bank 102, 104, 106 and 108 respectively. The other side of each of the relay coils 166 et seq. is connected by conductive means 188 with one side of the battery 178, the opposite side of battery 178 being coupled through switch 178 and a conductor 190 with the terminal 126 leading to all of the commoned wipers 46 when the plug 28 is engaged with the socket 20.

It will thus be clear that when the pole pieces 114 of the switch banks 102 et seq. are in their normal positions upon the corresponding contacts A of such banks, there is no circuit completed for the energization of any of the coils of relay devices 166 et seq. However, when the pole pieces 114 are simultaneously advanced to engage contacts 102–B, 104–B, 106–B and 108–B an energizing circuit for one or more of the coils of devices 166 et seq. may be completed from the corresponding pole piece 114 through the corresponding of conductors 136, 138, 140 or 142, the cable 26, plug 28, socket 20, cable 18 and the engagement of a corresponding one of the wipers 48, 50, 52 or 54 with the plate 66', thence back along the engagement with plate 66' with wiper 46 through the cable 18, socket 20, plug 28 and cable 26 to common terminal 126 and then through conductor 190 and switch 178 (when the latter is closed), back to one side of the battery 154, the opposite side of which is coupled with such coils of the devices 166 et seq. through conductive means 188. Thus, when the switch 100 is advanced to its first position off normal, the coils of each of the relay devices 166, 168, 170 and 172 for which there is engagement between a corresponding wiper 48, 50, 52 or 54 and the plates 66' will be energized.

As the pole pieces 114 are further advanced over contacts C and D no further energization of the coils 166 et seq. can occur, but when pole pieces 114 reach engagement with contacts 102–E, 104–E, 106–E and 108–E, those of the coils 166 et seq. for which there is engagement between the wipers 48, 50, 52 or 54 with the plate 66' of the next drum 38, will be energized in manner similar to that just described in connection with the terminal points 128 et seq. As the pole pieces 114 reach engagement with contacts H, K and N of the banks 102 et seq., similar energization of appropriate coils 166 et seq. will occur to read-out the condition of engagement between the wipers 48 et seq. and the plates 66' for the other drums 38. Obviously, more or less than the five drums assumed for purposes of illustration, can be handled, the only difference in the structure of FIG. 7 being the number of contacts to be provided upon the various banks of switch 100.

Operably associated with the coil 166 of relay 158 is a single pole, double throw relay switch 200 and a pair of normally open single pole relay switches 202 and 204. Operably associated with the coil 168 of relay devices 169 is a single pole, double throw relay switch 206, a normally closed single pole, single throw relay switch 203 and a pair of normally open single pole, single throw relay switches 210 and 212. In like manner, the relay 162 includes a pair of single pole, double throw relay switches 214 and 222, a normally closed single pole, single throw relay switch 220, and a pair of normally open single pole, single throw relay switches 216 and 218. The relay 164 includes three single pole, double throw relay switches 224, 228 and 232, three normally closed single pole, single throw relay switches 226, 230 and 236, and a normally open single pole, single throw relay switch 234.

A plurality of read-out devices, which in the preferred form of the invention may constitute solenoids for printing written records of numerals upon a card or the like 238, are provided and respectively numbered thereon with the numerals 0 through 9 inclusive in each case indicating the digit to which same corresponds and which it is adapted to imprint upon the sheet or card 238.

The relay switches 200–236 inclusive, provide for the translation or conversion of the coded data, represented by the selective energization of one or more of the relays 158, 160, 162 and 164, into decimal form for appropriately energizing the proper one of read-out solenoid devices 0–9 inclusive to indicate or record upon the card 238 or similar medium, the reading to which the angular position of rotation of the corresponding drum 38 is set by the condition of the meter 14. To illustrate the functioning of the relay switches 200–236 inclusive, an example may be given from which the operation of same to energize different of the read-out devices 0 through 9 will be apparent. Assume, for example, therefore, that a given drum 38 is rotated by its shaft 34 to a position indicating the digit 5 for the proper reading of that drum 38 of meter 14. When such drum 38 is so rotated, reference to FIG. 6 will render it clear that the associated wipers 46, 48 and 52 are engaged with the plate 66' but that the wipers 50 and 54 are not so engaged. Further, assuming that the switch 100 has been advanced to place the pole pieces 114 in engagement with the corresponding contacts of banks 102, 104, 106 and 108, the coils 166 and 170 of relays 158 and 162, corresponding to the wipers 48 and 52, will be energized, while the relays 160 and 164 whose corresponding wipers 50 and 54 are not in engagement with the plate 66', will remain deenergized. A circuit may then be traced from the battery 152 through the switch 176, a conductor 240, the shifted, closed portion of relay switch 200, conductor 242, the remaining closed relay switch 208, conductor 244, the shifted closed relay switch 218, conductor 246, the remaining closed relay switch 230 and conductor 248 to the read-out device 5 whose other side is coupled by conductors 250 and 252 with the opposite side of battery 152. Thus, the read-out device 5 will be energized to print the numeral 5 upon a sheet 238. The other devices 0–9 inclusive, are operable in comparable manner through the relay switch circuitry illustrated, as will be clear to those skilled in the art.

Referring now to the bank 110 of switch 100, it will be seen that its contacts C, F, I, L and O only are commoned together and coupled by conductive means 254 with one side of battery 156, the other side of which is coupled by conductive means 256 and 258 with one side of the card advancing solenoid 122 whose other side is in turn coupled by conductive means 260 with the pole piece 114 of switch bank 110. Solenoid 122 is operably coupled as indicated by the dash line 262 with a card 238 for moving the latter a discreet distance for each actuation of the solenoid 122. This provides for successive numerals printed by the read-out devices 0–9 inclusive being appropriately offset and arranged on the card 238. Since the exact nature of the mechanism 262 forms no part of the invention, it will be sufficient to note that it is electrically responsive upon energization of a device such as the solenoid 122 and operates to perform the noted shifting function upon the record card 238 in any of the conventional manners of accomplishing such result. By virtue of the choice of contacts 110–C, 110–F, 110–I, 110–L and 110–O for energizing the solenoid 122, which contacts are offset from those of banks 102, 104, 106 and 108 used for energizing the relay coils 166, 168, 170 and 172, it will be clear that the mechanism 262 always shifts the card 238 between printing operations of the read-out devices 0 through 9.

Referring next to bank 112 of switch 100 which may be used for controlling the stepping of the switch advancing solenoid 116, it will be seen that the contacts B through P inclusive of bank 12 are commoned and coupled through conductors 263, 278 and 256 with one side of the battery 156 but that the contact 112–A has no connection made thereto. Although the means utilized to automatically advance the stepping switch 100 may be varied from the exact system disclosed for illustrative purposes, the structure shown has been found quite satisfactory and is preferred. It includes, besides the parts already identified, a normally open single pole push-button switch 264, a relay 266 having a coil 268 and a pair of normally open single pole, single throw relay switches 270 and 272. Also provided are an electrical capacitor 274 and an electrical resistor 276.

Assuming the stepping switch 100 is in its normal condition with the wiper arms 114 all in their stand-by conditions engaging the contacts A of switch banks 102 et seq., and that the starting button switch 264 is momentarily closed. This completes an initial energizing circuit for the stepping solenoid 116 traceable from the battery 156 through conductors 256 and 278, stepping solenoid 116, conductor 280, momentarily closed switch 264 and conductor 282 back to the other side of battery 156. Energization of solenoid 116 advances all of the pole pieces 114 to contacts B of the banks 102 et seq., whereupon appropriate ones of the relays 158 et seq. coupled with switch banks 102, 104, 106 and 108 may be energized to actuate an appropriate one of the read-out devices 0–9 inclusive. As the pole pieces 114 advance to contacts B the switch 124 is closed and thereafter remains closed until the pole pieces 114 again reach the contacts A. While the solenoid 116 was initially energized, the switches 118 and 120 associated therewith were momentarily opened. However, upon release of the initial closing of the button switch 264, the solenoid 116 is deenergized and readied for the next advancement of the switch 100 when the solenoid 116 is again energized. Upon such deenergization of the solenoid 116, the switches 118 and 120 close. This completes an energizing circuit for the capacitor 274 through a circuit traceable from the battery 156 through conductors 256, 278, 263, contact 112–B, pole piece 114 of bank 112, conductor 284, reclosed switch 118, conductors 286 and 288 to capacitor 274, thence through conductor 290 and resistor 276 through conductors 292 and 254 back to the other side of battery 156. The values of the capacitor 274 and the resistor 276 are so chosen as to provide an RC time constant for the charging of capacitor 274 suitable to delay energization of the coil 268 of relay 266 until the read-out devices 0–9 or the solenoid 122, as the case may be, have had an opportunity to complete their functions before the switch 100 is further advanced. After capacitor 274 has thus been charged to a sufficient extent to make available enough remaining electric current on the conductor 286 for energization of the coil 268, the latter is energized from the conductor 286 through the coil 268 and conductors 294, 292 and 254 leading back to the battery 156.

Energization of coil 268 closes switches 270 and 270. Switch 272 upon closing, provides for full discharge of the capacitor 274. Simultaneously, however, closing of the switch 272 completes a reenergizing circuit for the stepping solenoid 116 traceable from battery 156 through conductors 256 and 278, solenoid 116, now reclosed switch 120, conductor 296, closed switch 124, closed relay switch 272 and conductors 294, 292 and 254 back to battery 156. Such reenergization of the solenoid 116 then steps all of the pole pieces 114 onto the contacts C of the banks 102 et seq., whereupon the card advancing solenoid 122 is operated. The cycling of stepping switch 116 then continues in the manner described until the pole pieces 114 have returned to their normal position in engagement with the contacts A of banks 102 et seq. During the course of such advancement of the pole pieces 114, the information available from the positions of each of the drums 38 will have been read-out, translated into decimalized form and utilized to actuate appropriate ones of the read-out devices 0 through 9 inclusive to print a record of the reading upon the card 238 being intermittently advanced by the solenoid 122.

If desired, indicator lights for showing the functional condition of various parts of the apparatus may be provided as at 297, 298 and 299, the functioning of same being obvious.

It will now be apparent that the apparatus contemplated and taught by this invention is ideally suited for accomplishing all of the objectives and advantages thereof hereinbefore mentioned. It is to be understood, of course, that those skilled in the art may make a number of minor modifications from the exact details of construction disclosed for illustrative purposes without departing from the principles of the invention. Accordingly, it is to be further understood that the invention should be deemed limited only by the scope of the claims that follow.

Having thus described the invention what is claimed as new and desired to be secured by Letters Patent is:

1. In apparatus of the class described, a public utility consumption meter located in an area of restricted access and having a plurality of rotatable metering shafts each of whose position of angular rotation represents a different digit of the consumption measurement made by the meter; electrical switching means within said area for each of said shafts respectively and each including a plurality of electrically separated, stationary contact parts and a rotatable drum having thereon a plurality of electrically intercoupled contact parts operably engageable with different of said stationary contact parts as said drum is rotated to move said contact parts thereon into different positions; means within said area for operably coupling each of said drums with a corresponding shaft for shifting said drum carried contact parts of each switching mechanism into said different positions thereof successively as the corresponding shaft is rotated; stationary electrical connector means outside said area and having a plurality of electrical contact members; stationary conductor means electrically coupling each of said members with a corresponding stationary contact part; a portable unit outside said area movable to and from a location proximate said stationary connector means and including electrical power source means, a single set of electrically responsive read-out devices for registering in predetermined numerical units any value of a single digit of said measurement corresponding to the position of any one of said shafts, and conductive means electrically coupled with said source means and said devices; portable electrical connector means for said unit outside said area and having an electrical contact element for each of said members respectively, said portable connector means being releasably coupled with said stationary connector means when said unit is in said location to place each of said elements temporarily in electrically coupled relationship with a corresponding member; portable conductor means electrically coupled with said elements; and structure in said unit for operably coupling those of said portable conductor means corresponding to each of said switching means respectively successively with said conductive means for selectively controlling successive operations of said set of devices in accordance with the respective positions of said drum carried contact parts of said plurality of switching means, said structure including electrical switching mechanism advanceable through a plurality of different switching conditions, electrically coupled with said portable conductor means and operative in successive conditions thereof, responsive to completion of electrical control paths through said portable conductor means, said elements, said members and engaged ones of said stationary and drum carried contact parts of that switching means corresponding to the condition of said mechanism, to change the state of completion of electrical energizing paths for the devices corresponding to said engaged parts of said corresponding switching means through said conductive means coupled with said devices and said source means, whereby the readings for each of said shafts may be registered successively by said single set of devices.

2. Apparatus as set forth in claim 1, wherein said mechanism comprises a stepping switch assembly having advancing means coupled with said source means for automatically advancing said mechanism successively through said conditions thereof.

3. Apparatus as set forth in claim 1, wherein said mechanism includes only four banks electrically coupled with said portable conductor means, said set includes ten devices, and there is provided a plurality of relays each having a number of relay switches coupled in circuit with said devices, said source means and said conductive means, and operating coils operably coupled with said relay switches for actuating the latter and electrically coupled with said source means and said mechanism for control of said operating coils responsive to the condition of said mechanism and the positioning of said drum carried contact parts of the corresponding switching means.

4. Apparatus as set forth in claim 1, wherein there is provided a shiftable record blank, said devices each includes means for recording the operation thereof on the shiftable record blank, and there is provided means operably coupled with said mechanism for shifting said record blank relative to said devices as the condition of said mechanism is changed.

References Cited in the file of this patent

UNITED STATES PATENTS

| | | |
|---|---|---|
| 1,815,710 | Guillemin | July 21, 1931 |
| 2,207,743 | Larson et al. | July 16, 1940 |
| 2,796,566 | Maynard | June 18, 1957 |
| 2,923,925 | Dickinson | Feb. 2, 1960 |